UNITED STATES PATENT OFFICE.

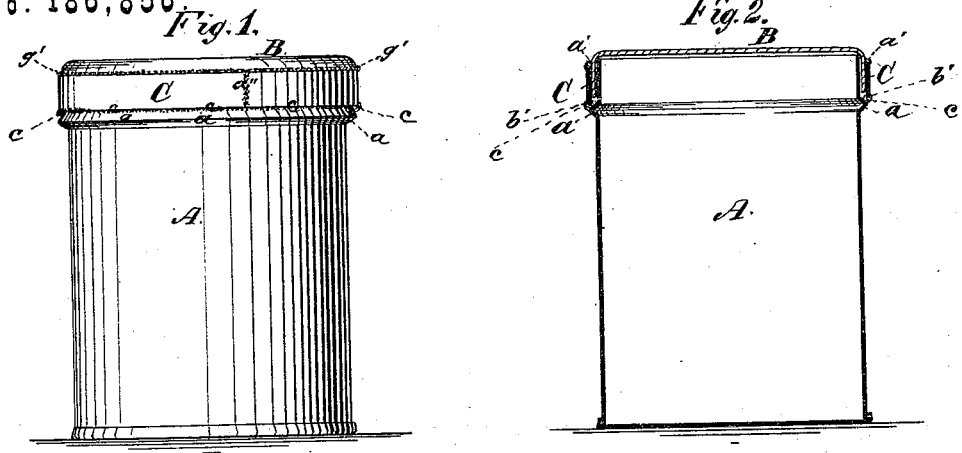
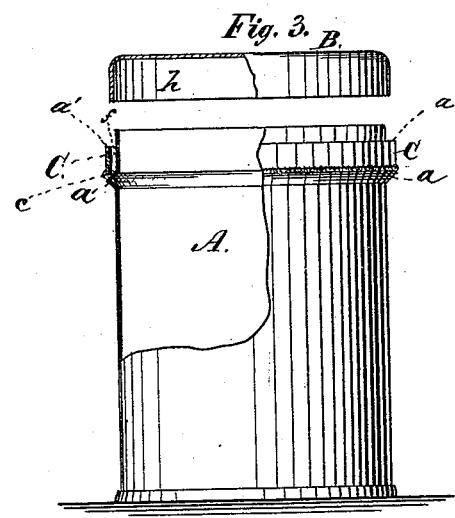
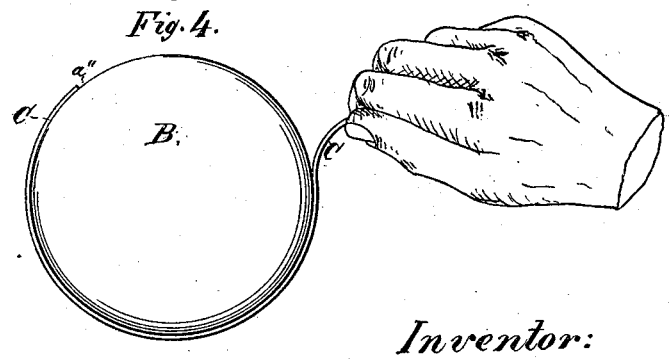

EDWIN A. LELAND, OF BROOKLYN, NEW YORK, ASSIGNOR TO LEONARD RICHARDSON, OF SAME PLACE.

IMPROVEMENT IN SHEET-METAL CANS.

Specification forming part of Letters Patent No. 186,856, dated January 30, 1877; application filed December 26, 1876.

*To all whom it may concern:*

Be it known that I, EDWIN A. LELAND, formerly of New York city, but now residing in the city of Brooklyn, county of Kings, and State of New York, have invented certain Improvements in Sheet-Metal Cans, of which the following is a specification:

This invention relates to that class of hermetically-sealed cans in which provision is made for the detachment of the cover without injury thereto by means of a metallic strip soldered to the cover and to the body of the can, and capable of being stripped or torn off, thereby permitting the removal of the cover from the can; and the object of this invention is to provide a can of the class specified, which shall be capable of more economical and convenient manufacture than those hitherto in use, and in which there shall be a greater certainty of the facile and easy tearing off of the strip without detracting in any way from the firmness and closeness with which, when the strip is in place, the can is sealed.

To this end the invention comprises the combination, with the cover and body of a sheet-metal can, of a strip of so-called black sheet-iron, the edges of which are bright or unoxidized from a recent act of cutting, the black or oxidized surface of the iron preventing the soldering of the strip at the central portions thereof, (which with tin sheet-metal strips has been a cause of much inconvenience, by causing the cover to be soldered direct to the can, and by soldering the strip itself more tightly in place than is desirable,) and the unoxidized edges of said strip providing for its ready soldering to the top and body of the can, respectively, without any special process of tinning, by which means a cheaper material may be used than has hitherto been considered possible, and a more uniform soldering of the strips, as well as a more definite and reliable degree of resistance to said soldering, is provided for than has hitherto been known in the manufacture of that class of cans to which this invention relates.

The invention further comprises a novel combination, with the body of the can, of the black sheet-metal strip soldered to a peripherical rib provided upon the aforesaid body, and with its upper edge arranged at an appreciable distance below the upper edge of the can itself, and with a space between the inner surface of the strip, when thus in place, and the upper surface of the can; by which means provision is made for the ready fitting of the cover in place, and the soldering of the upper edge of the black sheet-iron strip thereto, this portion of my said invention materially shortening and facilitating the operation of securing the said strip to the cover and body of the can.

Figure 1 is a side view of a can made according to my invention; Fig. 2, a vertical transverse section of the same; Fig. 3, a side view and partial section thereof, with the cover detached preparatory to its attachment in place; and Fig. 4 is a plan view, indicating the manner in which the strip, after being started by a suitable instrument, may be torn from the can by grasping with the fingers preparatory to the ready lifting off of the cover.

A is the body of the can, of the usual cylindric or other suitable shape, and B is the cover, calculated to fit upon the top of the body A in the usual or in any proper way. Upon the body A, at a suitable distance from the top thereof, is a circumferential bead, $a$. C is the strip of black sheet-iron, which, being newly cut from black sheet-iron sheets, has bright or unoxidized edges, as at $a'$ $b'$. This strip C is passed around the body of the can, and has its lower edge soldered to the rib $a$, as indicated at $c$, there being an annular space, $f$, between the strip and the adjacent portion of the body of the can, as represented more fully in Figs. 2 and 3. The strip is of such width that when put in position, as just explained, its upper edge is at an appreciable distance, say one-sixteenth to one-eighth of an inch, or more, from the upper edge of the body A, as also represented in Figs. 2 and 3. The space $f$ is of such size that when the cover is placed upon the top of the body A the flange $h$ of the cover B will fit snugly into this space $f$, and the upper edge of the strip being brought nearly coincident with the uppermost portion of the flange $h$, said edge may be soldered to said portion of the flange $h$, as indicated at $g'$, with very great ease and facility, and without the special mechanism ordinarily used in securing a tin sheet-metal strip to the cover and body of a can.

It is to be especially observed that inasmuch as the strip C is made of black sheet-iron, the surface of which, from its oxidized character, is incapable of adhesion to the solder in the soldering of said strip, either to the body or to the cover, is impossible except at the upper and lower edges of said strip, which, being left bright and unoxidized, as hereinbefore explained, readily receive the solder, and are thereby quickly and securely soldered to the adjacent portion of the cover B, and also to the rib $a$ of the body A; and inasmuch as this bright surface is always uniform—namely, equal in width to the thickness of the sheet metal—it follows that the strength of the soldered joint is always uniform, and is never in excess of that which is due to the narrow surfaces of the hereinbefore-specified edges, which alone, so far as the strip is concerned, are capable of holding the solder.

In order to open the can it is only necessary to drive some suitable instrument—as, for example, a screw-driver, small chisel, or the — downward into the joint at one side or the other of the line of junction $a''$, where the two ends of the strip C come together. One end of the strip, being thus loosened, may be grasped by the fingers, as represented in Fig. 4, and very readily torn off, after which the cover may be lifted in the same manner as from an ordinary sheet-metal can.

What I claim as my invention is—

1. The black sheet-metal strip C, having bright or unoxidized edges, soldered, respectively, to the circumference of the body A and that of the cover B of a sheet-metal can, substantially as set forth, for the purpose specified.

2. The black sheet-metal strip, having bright or unoxidized edges, soldered at its lower edge to the rib $a$ on the body of the can, with an annular space, $f$, between itself and the said body, and with its upper edge at an appreciable distance below the upper edge of the body, the whole combined and arranged substantially as and for the purpose herein set forth.

EDWIN A. LELAND.

Witnesses:
 EDWARD HOLLY,
 HENRY EICHLING.